(12) United States Patent
Hidaka et al.

(10) Patent No.: US 11,764,657 B2
(45) Date of Patent: Sep. 19, 2023

(54) ROTOR FOR ROTATING ELECTRIC MACHINE

(71) Applicant: Mitsubishi Electric Corporation, Tokyo (JP)

(72) Inventors: Yuki Hidaka, Tokyo (JP); Shohei Fujikura, Tokyo (JP); Taiga Komatsu, Tokyo (JP); Tatsuro Hino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 162 days.

(21) Appl. No.: 17/296,546

(22) PCT Filed: Aug. 21, 2019

(86) PCT No.: PCT/JP2019/032610
§ 371 (c)(1),
(2) Date: May 25, 2021

(87) PCT Pub. No.: WO2020/144888
PCT Pub. Date: Jul. 16, 2020

(65) Prior Publication Data
US 2022/0029512 A1 Jan. 27, 2022

(30) Foreign Application Priority Data
Jan. 10, 2019 (JP) .................................. 2019-002318

(51) Int. Cl.
*H02K 21/04* (2006.01)
(52) U.S. Cl.
CPC .................................. *H02K 21/042* (2013.01)
(58) Field of Classification Search
CPC .......... H02K 1/223; H02K 1/27; H02K 19/10; H02K 21/04; H02K 21/042; H02K 21/14
See application file for complete search history.

(56) References Cited

U.S. PATENT DOCUMENTS

| 5,955,807 A | 9/1999 | Kajiura et al. |
| 2002/0047484 A1 | 4/2002 | Umeda |

(Continued)

FOREIGN PATENT DOCUMENTS

| EP | 2 991 194 A1 | 3/2016 | |
| EP | 2991194 A1 * | 3/2016 | ............... H02K 1/24 |

(Continued)

OTHER PUBLICATIONS

Extended European Search Report dated Feb. 2, 2022 in European Patent Application No. 19908910.3, 10 pages.

(Continued)

*Primary Examiner* — Tulsidas C Patel
*Assistant Examiner* — Joshua Kiel M Rodriguez
(74) *Attorney, Agent, or Firm* — XSENSUS LLP

(57) ABSTRACT

Provided is a rotor for a rotating electric machine, which enables suppression of a reduction in output of a rotating electric machine. The rotor for a rotating electric machine includes: a rotor core having winding-portion insertion holes and magnet insertion holes; rotor winding portions inserted into the winding-portion insertion holes; and rotor permanent magnets inserted into the magnet insertion holes, wherein each of the rotor winding portions includes: a non-magnet portion; and a rotor winding provided to the non-magnet portion, wherein each of the non-magnet portions is fixed to the rotor core, and wherein the rotor windings are fixed to the rotor core through intermediation of the non-magnet portions.

25 Claims, 12 Drawing Sheets

(56) References Cited

U.S. PATENT DOCUMENTS

| | | | |
|---|---|---|---|
| 2003/0102758 A1* | 6/2003 | Kusase | H02K 21/046 |
| | | | 310/261.1 |
| 2003/0209950 A1 | 11/2003 | Biais et al. | |
| 2005/0236920 A1 | 10/2005 | Kusase et al. | |
| 2006/0082238 A1 | 4/2006 | Kusase et al. | |
| 2016/0204722 A1 | 7/2016 | Sudhoff et al. | |

FOREIGN PATENT DOCUMENTS

| | | | | |
|---|---|---|---|---|
| JP | 52-149209 U1 | | 11/1977 | |
| JP | 5-304752 A | | 11/1993 | |
| JP | 05304752 A | * | 11/1993 | |
| JP | 10-304633 A | | 11/1998 | |
| JP | 2001-286111 A | | 10/2001 | |
| JP | 2003-164127 A | | 6/2003 | |
| JP | 2003-324874 A | | 11/2003 | |
| JP | 2011-041433 A | | 2/2011 | |
| JP | 2011041433 A | * | 2/2011 | H02K 1/223 |
| JP | 2013-162612 A | | 8/2013 | |
| JP | 2016-93044 A | | 5/2016 | |
| JP | 2017-204962 A | | 11/2017 | |
| WO | 2014/188505 A1 | | 11/2014 | |

OTHER PUBLICATIONS

International Search Report and Written Opinion dated Oct. 15, 2019, received for PCT Application PCT/JP2019/032610, Filed on Aug. 21, 2019, 11 pages including English Translation.

Notice of Reason for Refusal dated Mar. 3, 2020, received for PCT Application 2020-503835, 11 pages including English Translation.

\* cited by examiner

RADIAL DIRECTION

ROTATING DIRECTION

AXIAL DIRECTION

ROTOR FOR ROTATING ELECTRIC MACHINE

CROSS-REFERENCE TO RELATED APPLICATIONS

The present application is based on PCT filing PCT/JP2019/032610, filed Aug. 21, 2019, which claims priority to JP 2019-002318, filed Jan. 10, 2019, the entire contents of each are incorporated herein by reference.

TECHNICAL FIELD

This invention relates to a rotor for a rotating electric machine, which includes rotor winding portions provided in a rotor core.

BACKGROUND ART

Hitherto, there is known a rotor for a rotating electric machine, which includes a rotor core and rotor winding portions. The rotor core has winding-portion insertion holes. The rotor winding portions are inserted into the winding-portion insertion holes. Each of the rotor winding portions includes a winding-portion permanent magnet and a rotor winding wound around the winding-portion permanent magnet (see, for example, Patent Literature 1).

CITATION LIST

Patent Literature

[PTL 1] JP 2013-162612 A

SUMMARY OF INVENTION

Technical Problem

However, when a current is supplied to the rotor windings, the rotor windings generate heat. The heat generated in the rotor windings transfers to the winding-portion permanent magnets. Through the heat transfer, a temperature of the winding-portion permanent magnets rises. Thus, a magnetic force of the winding-portion permanent magnets decreases. As a result, there arises a problem in that an output of a rotating electric machine may decrease.

This invention has been made to solve the problem described above, and has an object to provide a rotor for a rotating electric machine, which enables suppression of a reduction in output of a rotating electric machine.

Solution to Problem

According to one embodiment of this invention, there is provided a rotor for a rotating electric machine, including: a rotor core having magnet insertion holes; rotor winding portions provided in the rotor core; and rotor permanent magnets inserted into the magnet insertion holes, wherein each of the rotor winding portions includes: a non-magnet portion formed of a magnetic member other than a permanent magnet or a non-magnetic member; and a rotor winding provided to the non-magnet portion, wherein each of the non-magnet portions has a fixed surface fixed to the rotor core, and wherein the rotor windings are fixed to the rotor core through intermediation of the non-magnet portions.

According to one embodiment of this invention, there is provided a rotor for a rotating electric machine, including: a rotor core; and rotor winding portions provided in the rotor core, wherein each of the rotor winding portions includes: a non-magnet portion formed of a magnetic member other than a permanent magnet or a non-magnetic member; a rotor winding provided to the non-magnet portion; and a winding-portion permanent magnet provided in the non-magnet portion in such a manner as to be separate from the rotor winding, wherein each of the non-magnet portions has a fixed surface fixed to the rotor core, and wherein the rotor windings are fixed to the rotor core through intermediation of the non-magnet portions.

Advantageous Effects of Invention

The rotor for a rotating electric machine according to this invention enables the suppression of a reduction in output of a rotating electric machine.

DESCRIPTION OF EMBODIMENTS

Now, a rotating electric machine according to embodiments of this invention is described with reference to the drawings. In each of the drawings, elements necessary for description of the rotating electric machine according to the embodiments of this invention are illustrated. However, not all the actual elements are illustrated. In the rotating electric machine according to the embodiments of this invention, any suitable fixing method may be used as long as a target object can be fixed. Thus, any fixing method may be used. Further, in the rotating electric machine according to the embodiments of this invention, "being equal to each other in dimensions" means that dimensions are substantially the same. In other words, even when dimensions are different from each other, the dimensions are described as "being equal to each other" as long as a difference therebetween falls within a range of a dimensional tolerance.

First Embodiment

Figure 1:
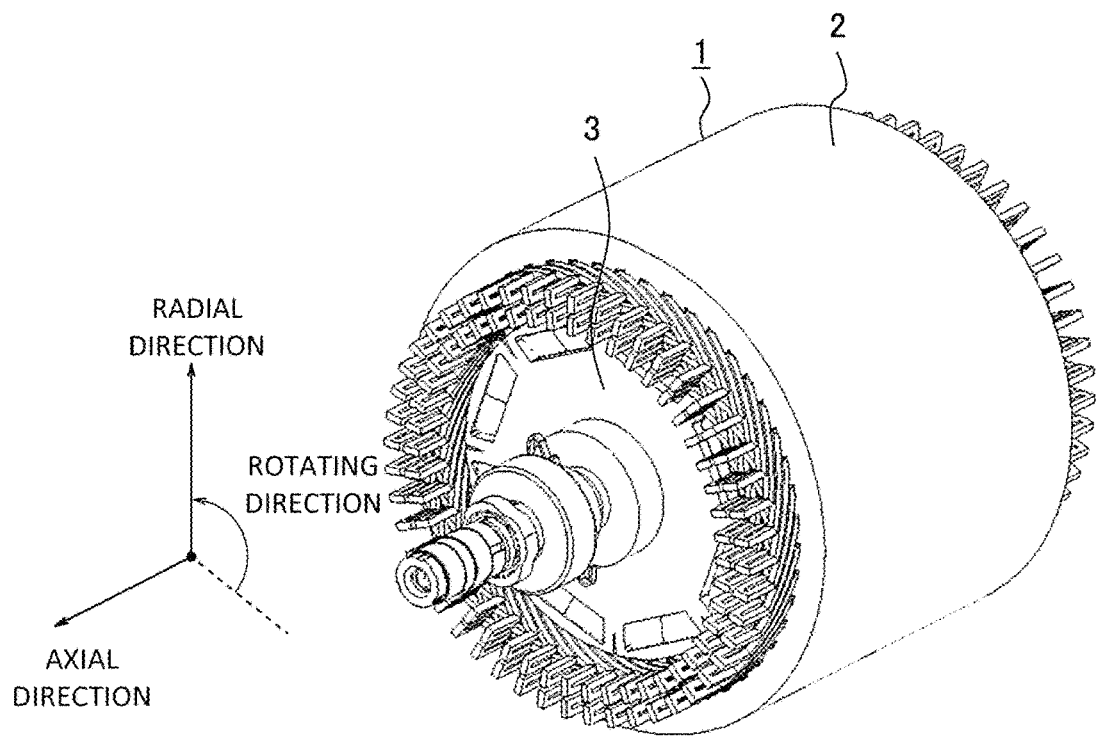
FIG. 1 is a perspective view for illustrating a rotating electric machine according to a first embodiment of this invention.

FIG. 1 is a perspective view for illustrating a rotating electric machine according to a first embodiment of this invention. As a rotating electric machine 1, for example, a vehicle AC power generator motor is given. The rotating electric machine 1 includes a stator 2 and a rotor 3. The rotor 3 is configured to be rotated with respect to the stator 2. The stator 2 is arranged so as to surround an outer periphery of the rotor 3. The stator 2 is fixed to a front bracket (not shown) and a rear bracket (not shown).

In this example, a "rotating direction" refers to a direction in which the rotor 3 is rotated, a "radial direction" refers to a radial direction of the rotor 3, and an "axial direction" refers to an axial direction of the rotor 3.

Figure 2:
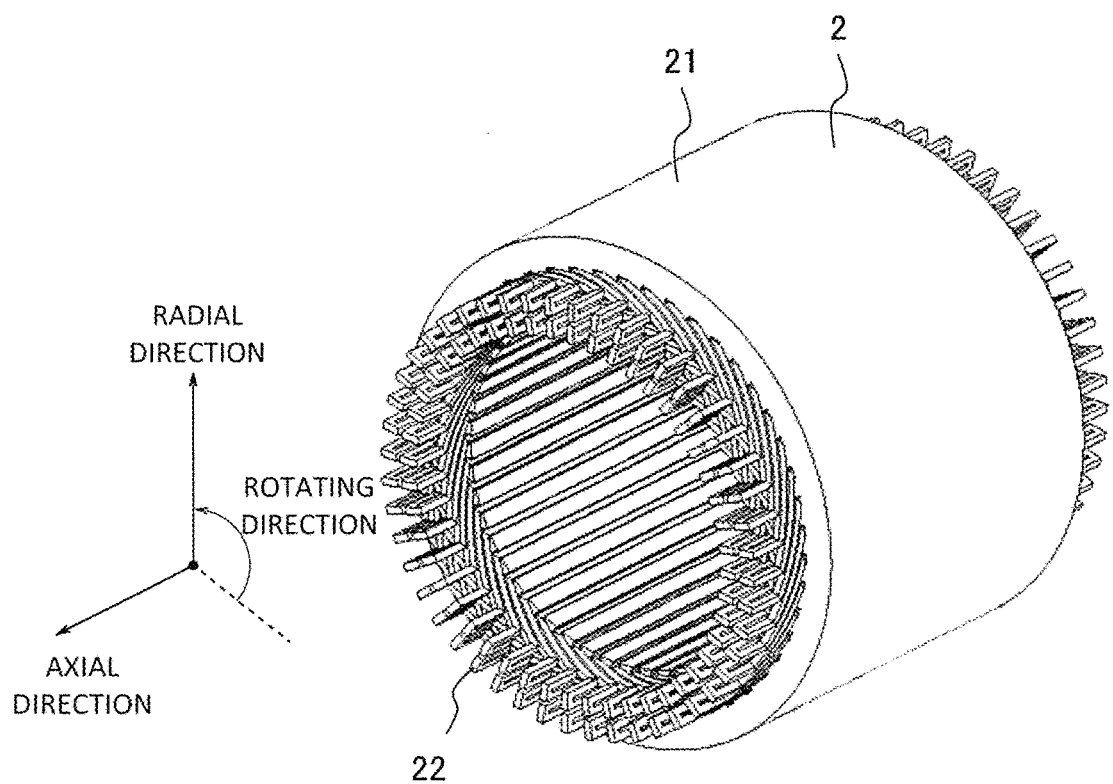
FIG. 2 is a perspective view for illustrating a stator of FIG. 1.

FIG. 2 is a perspective view for illustrating the stator 2 of FIG. 1. The stator 2 includes a stator core 21 and a plurality of stator windings 22. The plurality of stator windings 22 are provided to the stator core 21. The stator core 21 is formed to have an annular shape. The plurality of stator windings 22 are arranged side by side in a circumferential direction of the rotor 3.

Figure 3:
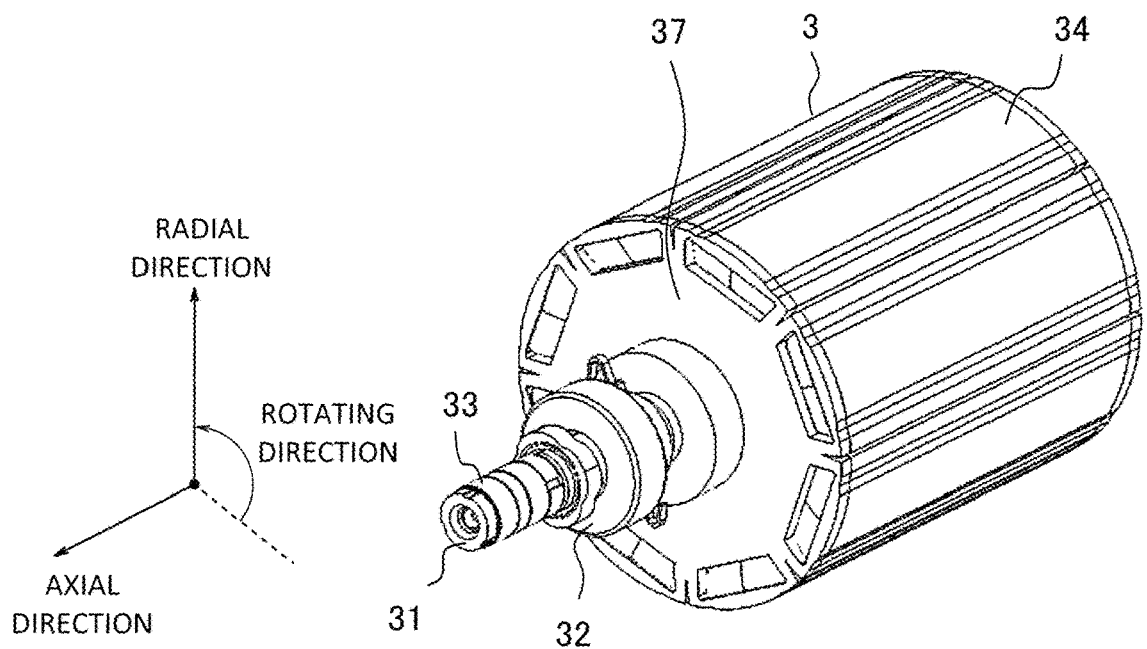
FIG. 3 is a perspective view for illustrating a rotor of FIG. 1.

FIG. 3 is a perspective view for illustrating the rotor 3 of FIG. 1. The rotor 3 includes a shaft 31, bearings 32, a slip ring 33, and a rotor core 34. The bearings 32 are provided on the shaft 31. The slip ring 33 is provided on the shaft 31. The rotor core 34 is provided on the shaft 31. The shaft 31 is rotatably supported by the front bracket and the rear bracket through intermediation of the bearings 32. The slip ring 33 is arranged farther from the rotor core 34 than the bearings 32 in the axial direction. The slip ring 33 is arranged closer to the rear bracket than to the front bracket in the axial direction. Further, the rotor 3 includes a brush (not shown) that is in contact with the slip ring 33.

The rotor core 34 is formed in a columnar shape. A radial direction of the rotor core 34 matches the radial direction of the rotor 3. An axial direction of the rotor core 34 matches the radial direction of the rotor 3. A circumferential direction of the rotor core 34 matches the circumferential direction of the rotor 3.

Figure 4:
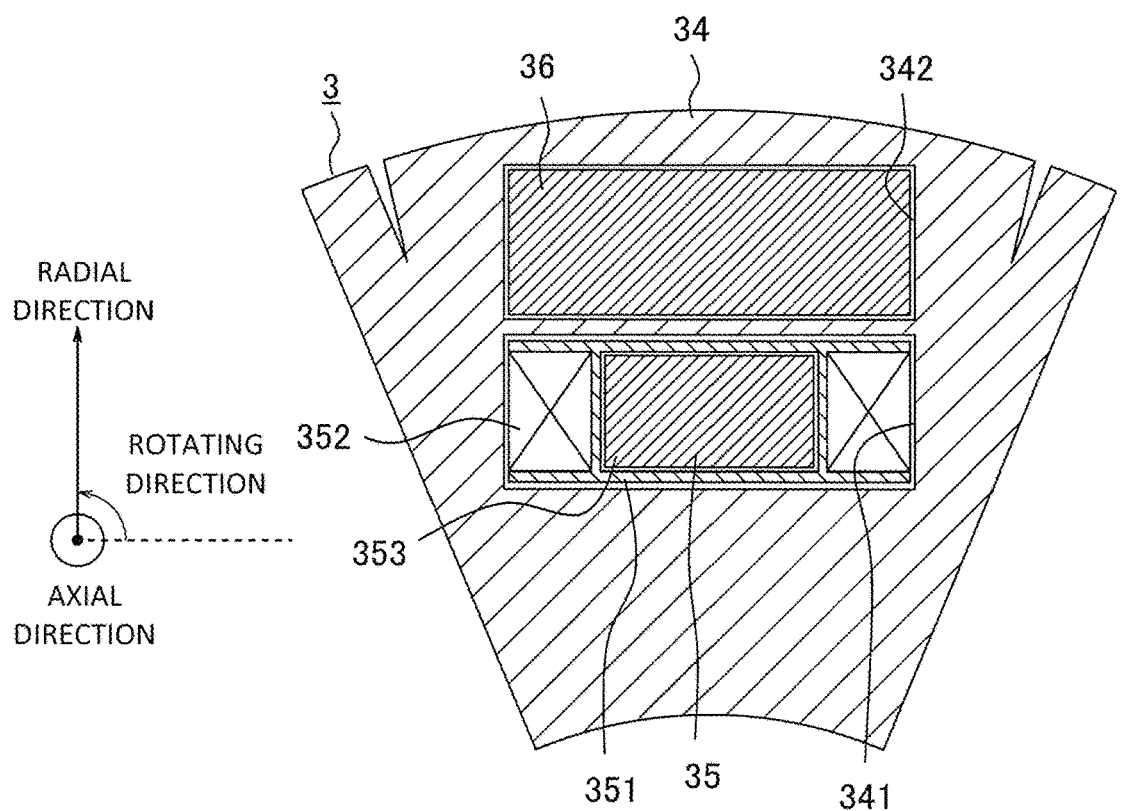
FIG. 4 is a sectional view for illustrating a main part of the rotor of FIG. 3.

FIG. 4 is a sectional view for illustrating a main part of the rotor 3 of FIG. 3. The rotor core 34 has winding-portion insertion holes 341 and magnet insertion holes 342. In FIG. 4, one winding-portion insertion hole 341 and one magnet insertion hole 342 are illustrated. However, the rotor core 34 has a plurality of winding-portion insertion holes 341 and a plurality of magnet insertion holes 342. The plurality of winding-portion insertion holes 341 are arranged side by side at equal intervals in the circumferential direction of the rotor core 34, and the plurality of magnet insertion holes 342 are arranged in the same manner. Further, the winding-portion insertion holes 341 and the magnet insertion holes 342 are formed to extend in the axial direction of the rotor core 34. The winding-portion insertion hole 341 and the magnet insertion hole 342 are arranged in alignment in the radial direction of the rotor core 34. The magnet insertion hole 342 is arranged on an outer side of the winding-portion insertion hole 341 in the radial direction of the rotor core 34.

The rotor 3 further includes rotor winding portions 35 and rotor permanent magnets 36. The rotor winding portions 35 are inserted into the winding-portion insertion holes 341. The rotor permanent magnets 36 are inserted into the magnet insertion holes 342. One rotor winding portion 35 is inserted into each of the plurality of winding-portion insertion holes 341. One rotor permanent magnet 36 is inserted into each of the plurality of magnet insertion holes 342. The rotor winding portion 35 and the rotor permanent magnet 36 are arranged in alignment in the radial direction of the rotor core 34. The rotor permanent magnet 36 is arranged on an outer side of the rotor winding portion 35 in the radial direction of the rotor core 34.

Each of the rotor winding portions 35 includes a non-magnet portion 351, a rotor winding 352, and a winding-portion permanent magnet 353. The rotor winding 352 is provided to the non-magnet portion 351. The winding-portion permanent magnet 353 is provided in the non-magnet portion 351. The non-magnet portion 351 is formed of a magnetic member other than a permanent magnet or a non-magnetic member. A current is supplied to the rotor winding 352 via the brush and the slip ring 33.

As illustrated in FIG. 3, the rotor 3 further includes an end plate 37 configured to hold the rotor permanent magnets 36. The end plate 37 suppresses movement of the rotor permanent magnets 36 in the axial direction with respect to the rotor core 34.

As illustrated in FIG. 4, the winding-portion permanent magnet 353 is provided in the non-magnet portion 351 in such a manner as to be separate from the rotor winding 352. The non-magnet portion 351 is fixed to the rotor core 34. The non-magnet portion 351 has fixed surfaces fixed to the rotor core 34. The fixed surfaces of the non-magnet portion 351 are fixed to inner surfaces of the winding-portion insertion hole 341. The rotor winding 352 is wound around the non-magnet portion 351. A direction perpendicular to a winding direction of the rotor winding 352 is defined as a winding-axis direction. The rotor winding 352 is arranged in such a manner that the winding-axis direction thereof matches the radial direction of the rotor core 34.

The winding-portion permanent magnet 353 is surrounded by the rotor winding 352 in the circumferential direction and the axial direction. In other words, the winding-portion permanent magnet 353 is arranged inside the rotor winding 352 in the circumferential direction and the axial direction. Ends of the non-magnet portion 351 in the radial direction are fixed to the rotor core 34. The rotor winding 352 is fixed to the rotor core 34 through intermediation of the non-magnet portion 351.

Figure 5:
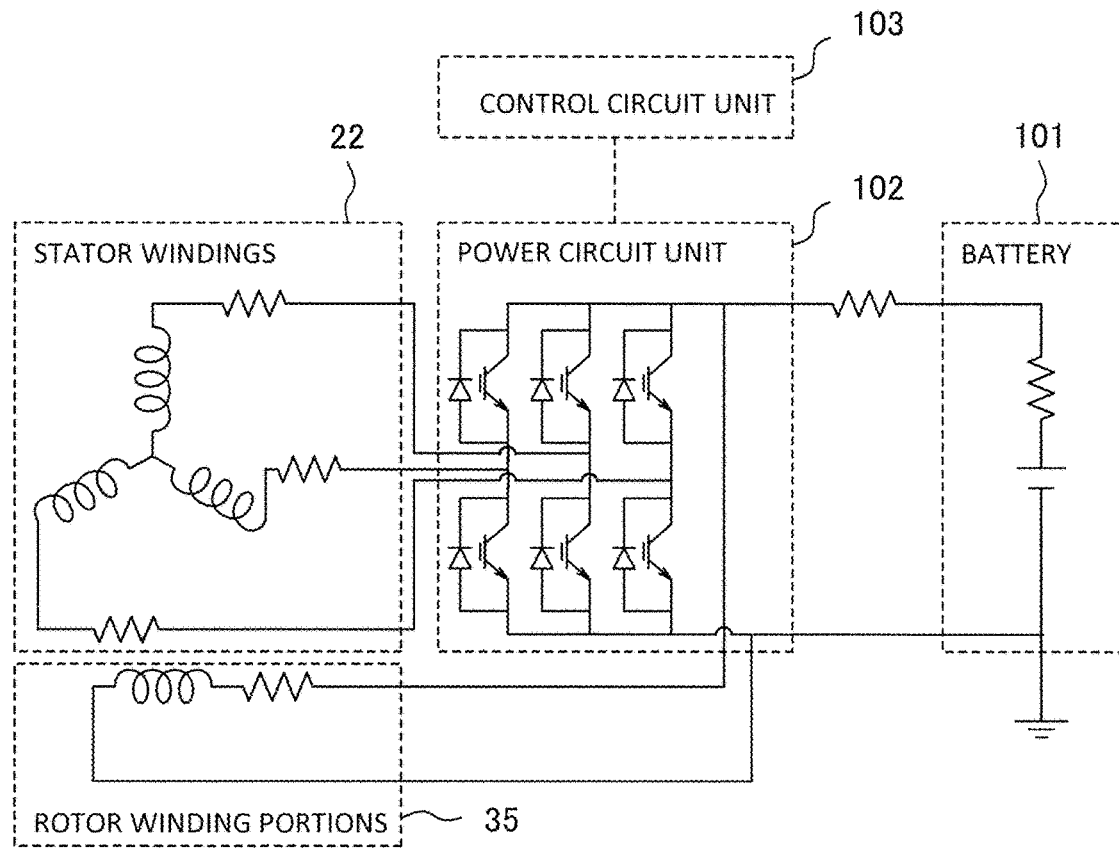
FIG. 5 is a circuit diagram for illustrating the rotating electric machine of FIG. 1.

Next, an operation of the rotating electric machine 1 is described. First, description is made of a case in which the rotating electric machine 1 operates as a motor. FIG. 5 is a circuit diagram for illustrating the rotating electric machine 1 of FIG. 1. A direct current is supplied from a battery 101 through a power supply terminal to a power circuit unit 102. A control circuit unit 103 performs on/off control on each switching element of the power circuit unit 102. Through the on/off control, the power circuit unit 102 converts the direct current to an alternating current. The alternating current is supplied to the stator windings 22 of the stator 2.

Meanwhile, a direct current is supplied to the rotor windings 352 of the rotor winding portions 35 based on a command from the control circuit unit 103. Magnetic flux generated by the rotor windings 352, magnetic flux generated by the winding-portion permanent magnets 353, and magnetic flux generated by the rotor permanent magnets 36 link the alternating current flowing through the stator windings 22 to thereby generate a driving torque. With the thus generated driving torque, the rotor 3 is rotated with respect to the stator 2.

Next, description is made of a case in which the rotating electric machine 1 operates as a generator. Under a state in which an engine is being driven, a rotational torque of the engine is transmitted from a crankshaft to the shaft 31 via mechanical connecting components such as a belt and a gear. As a result, the rotor 3 is rotated with respect to the stator 2.

A direct current is supplied to the rotor windings 352 of the rotor winding portions 35 based on the command from the control circuit unit 103. The magnetic flux generated by the rotor windings 352, the magnetic flux generated by the winding-portion permanent magnets 353, and the magnetic flux generated by the rotor permanent magnets 36 link the stator windings 22 to thereby induce a three-phase AC voltage in the stator windings 22. As a result, an alternating current is supplied to the power circuit unit 102. The control circuit unit 103 performs on/off control on each of the switching elements of the power circuit unit 102. Through the on/off control, the power circuit unit 102 converts the alternating current to a direct current. The direct current is supplied to the battery 101. As a result, the battery 101 is charged.

In a case in which the rotating electric machine 1 operates as the motor and the generator, a current is not always required to be supplied to the rotor windings 352. The rotating electric machine 1 can operate as the motor and the generator by using only the magnetic flux generated by the rotor permanent magnets 36.

Figure 6:
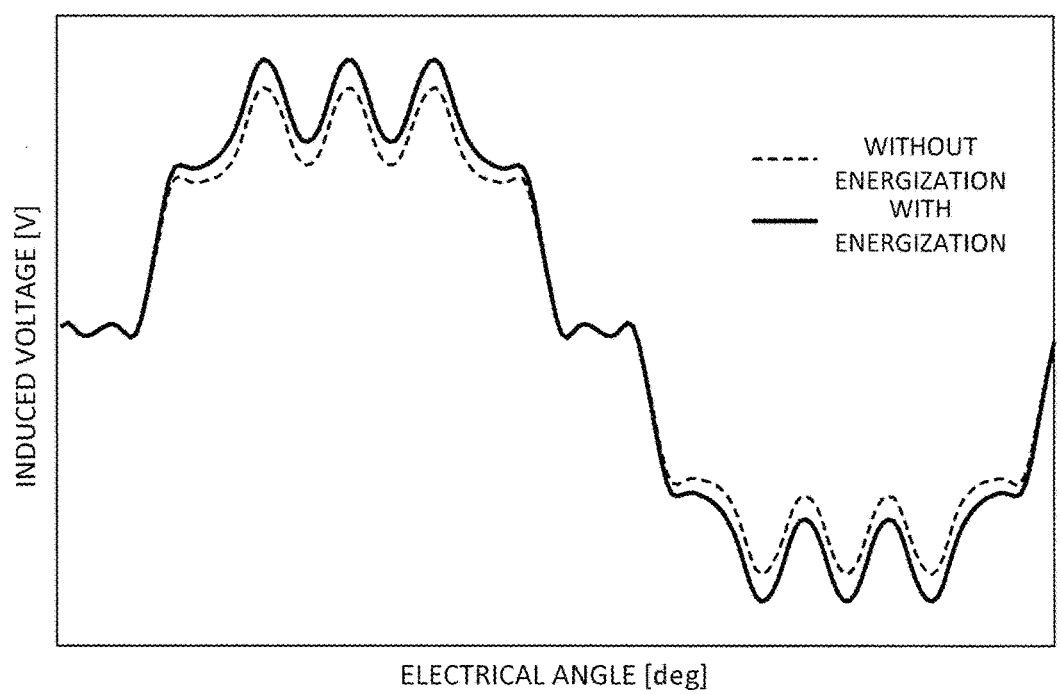
FIG. 6 is a graph for showing an induced voltage generated in stator windings of FIG. 2.

FIG. 6 is a graph for showing an induced voltage generated in the stator windings 22 of FIG. 2. In FIG. 6, there are shown the induced voltage generated at the time of energization during which the current is supplied to the rotor windings 352 and the induced voltage generated at the time of non-energization during which the current is not supplied to the rotor windings 352. A direction of the magnetic flux generated by the rotor windings 352 at the time of the energization is such that the magnetic flux of the rotor permanent magnets 36 is increased. In other words, the direction of the magnetic flux generated by the rotor windings 352 at the time of the energization matches a direction of the magnetic flux of the rotor permanent magnets 36.

The current supplied to the rotor windings 352 is not always required to be supplied via the slip ring and the brush. The rotating electric machine 1 may be of self-excited type in which the current is supplied to the rotor windings 352 by using a voltage induced in the rotor windings 352. The voltage is induced by the magnetic flux resulting from the supply of the current to the stator windings 22.

As described above, in the rotor 3 for the rotating electric machine 1 according to the first embodiment of this invention, the rotor windings 352 are fixed to the rotor core 34 through intermediation of the non-magnet portions 351. The rotor permanent magnets 36 are inserted into the magnet insertion holes 342. Thus, the rotor permanent magnets 36 are arranged in such a manner as to be separate from the rotor windings 352. With this arrangement, transfer of heat generated in the rotor windings 352 to the rotor permanent magnets 36 is suppressed. As a result, a rise in temperature of the rotor permanent magnets 36 can be suppressed. Thus, a thermal demagnetization resistance characteristic of the rotor permanent magnets 36 can be improved. As a result, a reduction in output of the rotating electric machine 1 can be suppressed.

Further, the rotor winding portions 35 are inserted into the winding-portion insertion holes 341, and the fixed surfaces of each of the non-magnet portions 351 are fixed to the inner surfaces of the winding-portion insertion hole 341. In this manner, the rotor winding portions 35 can easily be arranged in the rotor core 34.

Further, the winding-portion permanent magnet 353 is provided in the non-magnet portion 351 in such a manner as to be separate from the rotor winding 352. The arrangement described above suppresses the transfer of the heat generated in the rotor windings 352 to the winding-portion permanent magnets 353. As a result, a rise in temperature of the winding-portion permanent magnet 353 can be suppressed. Thus, a thermal demagnetization resistance characteristic of the winding-portion permanent magnet 353 can be improved. As a result, a reduction in output of the rotating electric machine 1 can be suppressed.

Further, the rotor winding portions 35 are fixed to the rotor core 34. With the arrangement described above, after the rotor winding 352 is wound around the non-magnet portion 351, the rotor winding portion 35 can be fixed to the rotor core 34. As a result, the rotor winding 352 is easily wound. Thus, productivity of the rotor 3 can be improved.

In the first embodiment described above, the winding-portion insertion holes 341 are formed in the rotor core 34, and the rotor winding portions 35 are inserted into the winding-portion insertion holes 341. However, the configuration of the rotor is not limited to that described above. For example, the rotor core 34 may be divided into a plurality of portions, and the fixed surfaces of the non-magnet portion 351 may be fixed to at least one of the plurality of divided portions.

Second Embodiment

Figure 7:
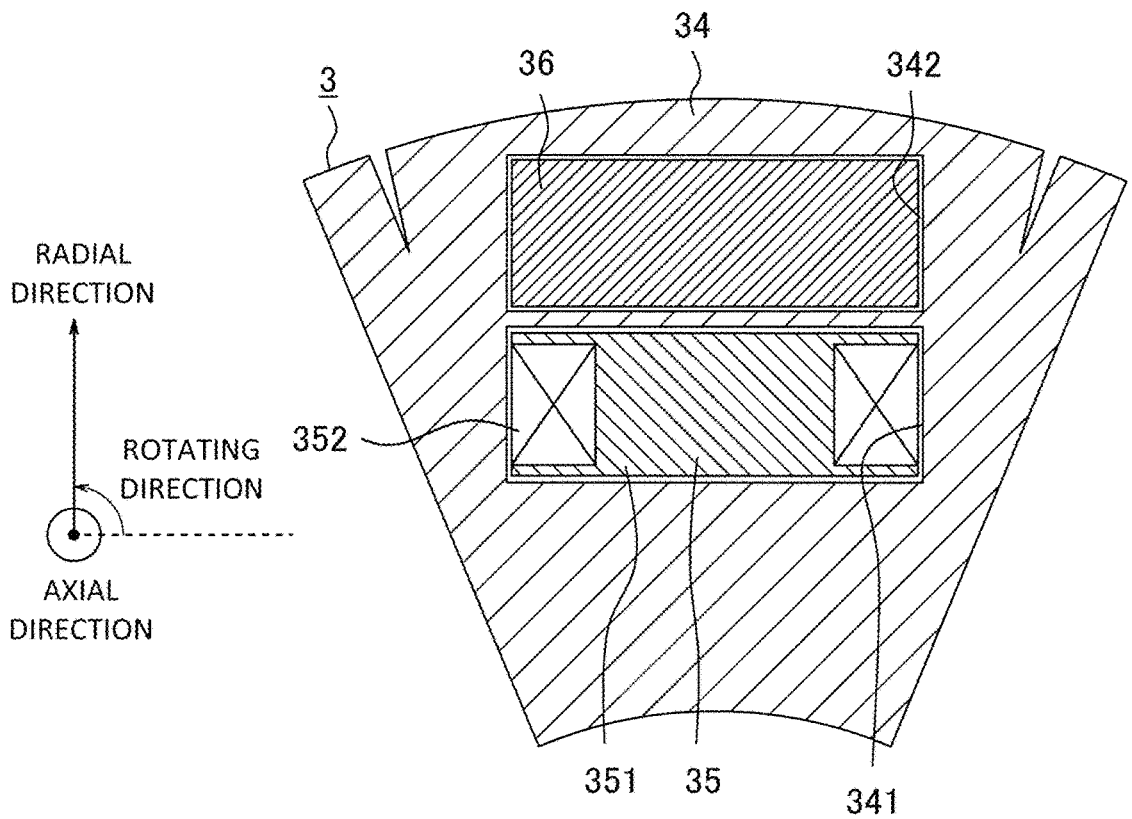
FIG. 7 is a sectional view for illustrating a main part of a rotor for a rotating electric machine according to a second embodiment of this invention.

FIG. 7 is a sectional view for illustrating a main part of a rotor for a rotating electric machine according to a second embodiment of this invention. The rotor winding portion 35 includes the non-magnet portion 351 and the rotor winding 352 provided in the non-magnet portion 351. In contrast to the first embodiment, the rotor winding portion 35 does not include the winding-portion permanent magnet 353. Other configurations are the same as those of the rotor of the first embodiment.

As described above, in the rotor 3 for the rotating electric machine 1 according to the second embodiment of this invention, the rotor windings 352 are fixed to the rotor core 34 through intermediation of the non-magnet portions 351.

The rotor permanent magnets 36 are inserted into the magnet insertion holes 342. Thus, the rotor permanent magnets 36 are arranged in such a manner as to be separate from the rotor windings 352. With this arrangement, transfer of heat generated in the rotor windings 352 to the rotor permanent magnets 36 is suppressed. As a result, a rise in temperature of the rotor permanent magnets 36 can be suppressed. Thus, a thermal demagnetization resistance characteristic of the rotor permanent magnets 36 can be improved. As a result, a reduction in output of the rotating electric machine 1 can be suppressed.

Third Embodiment

Figure 8:
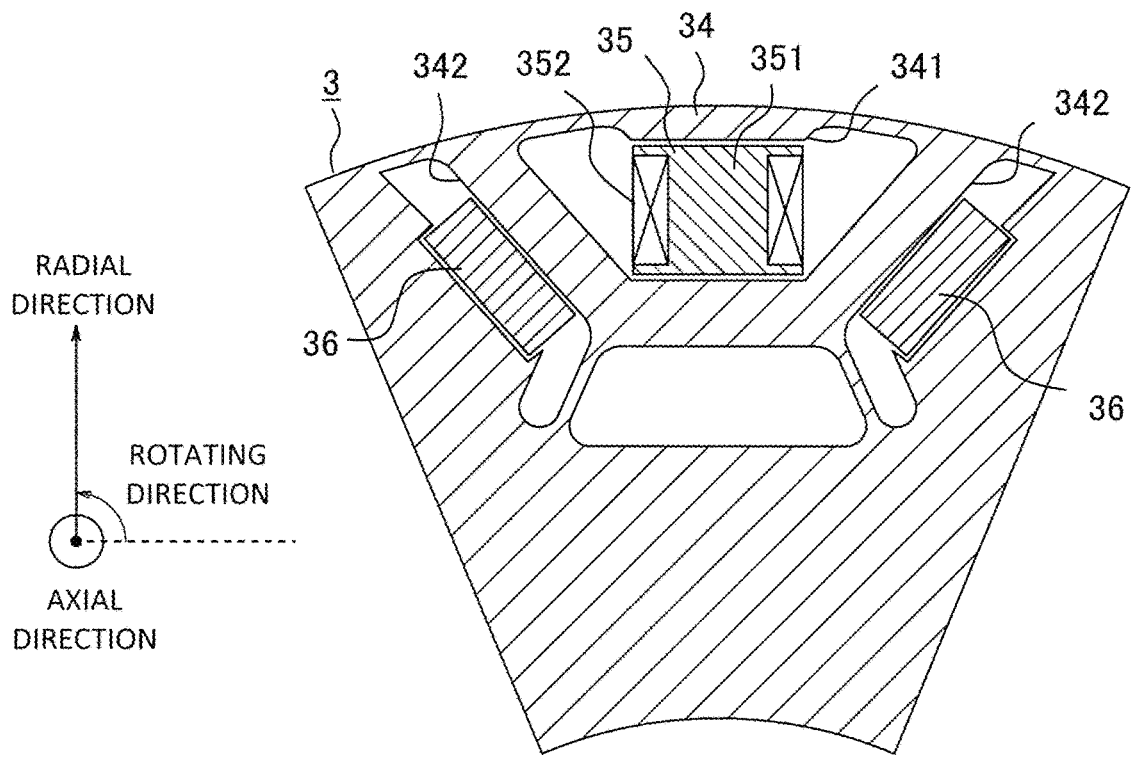
FIG. 8 is a sectional view for illustrating a main part of a rotor for a rotating electric machine according to a third embodiment of this invention.

FIG. 8 is a sectional view for illustrating a main part of a rotor for a rotating electric machine according to a third embodiment of this invention. The rotor core 34 has pairs of the magnet insertion holes 342, which are arranged side by side in the circumferential direction of the rotor core 34. One pair of the rotor permanent magnets 36 are separately inserted into one pair of the magnet insertion holes 342, respectively.

The rotor winding portion 35 is arranged at a center of a region between one pair of the rotor permanent magnets 36 in the circumferential direction of the rotor core 34. One pair of the rotor permanent magnets 36 are arranged so that surfaces of the rotor permanent magnets 36, each being located on a side closer to the rotor winding portion 35, have the same magnetic polarity. Other configurations are the same as those of the rotor of the second embodiment.

Figure 9:
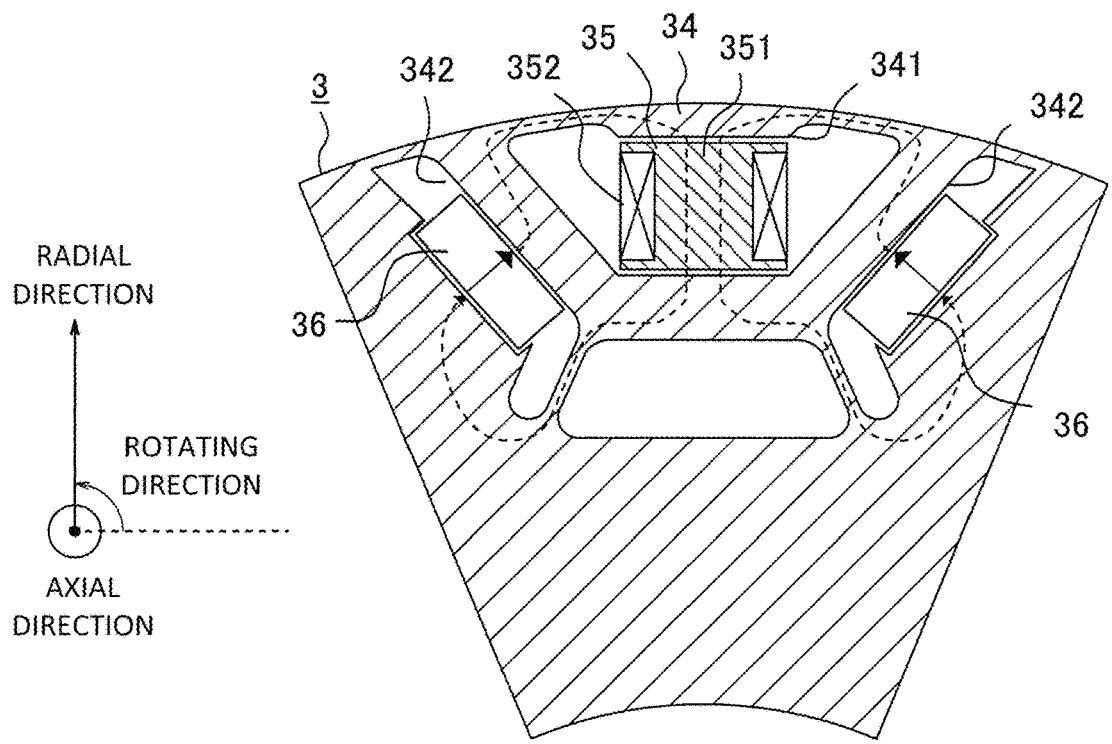
FIG. 9 is a view for illustrating magnetic flux passing through the rotor when a current is not supplied to rotor windings of FIG. 8.

FIG. 9 is a view for illustrating magnetic flux passing through the rotor 3 when a current is not supplied to the rotor windings 352 of FIG. 8. When a current is not supplied to the rotor windings 352, magnetic flux generated by the rotor permanent magnet 36 passes through a magnetic circuit. The magnetic circuit passes from the rotor permanent magnet 36 through the non-magnet portion 351 to return to the rotor permanent magnet 36. In other words, the magnetic flux generated by the rotor permanent magnet 36 is closed in the rotor 3. With the configuration described above, the voltage induced in the stator windings 22 through the rotation of the rotor 3 is reduced.

Meanwhile, when a current is supplied to the rotor windings 352, a direction of the magnetic flux generated by the rotor permanent magnet 36 and a direction of the magnetic flux generated by the rotor winding 352 are the same. With the magnetic flux described above, the voltage induced in the stator windings 22 through the rotation of the rotor 3 is increased.

As described above, in the rotor 3 for the rotating electric machine 1 according to the third embodiment of this invention, the rotor winding portion 35 is arranged at the center of the region between one pair of the rotor permanent magnets 36 in the circumferential direction of the rotor core 34. With the arrangement described above, when a current is supplied to the rotor windings 352, the voltage that is induced in the stator windings 22 through the rotation of the rotor 3 can be increased. Further, when a current is not supplied to the rotor windings 352, the voltage that is induced in the stator windings 22 through the rotation of the rotor 3 can be reduced. As a result, a range in which the amount of magnetic flux passing from the rotor core 34 through the stator windings 22 is adjusted depending on whether or not the current is supplied to the rotor windings 352 can be increased. Thus, efficiency of the rotating electric machine 1 can be improved to increase an output of the rotating electric machine 1.

Further, each pair of rotor permanent magnets 36 are arranged so that the surfaces of the rotor permanent magnets 36, each being located on the side closer to the rotor winding portion 35, have the same magnetic polarity. This arrangement allows the pair of rotor permanent magnets 36 to form the same magnetic polarity in the rotor 3.

Fourth Embodiment

Figure 10:
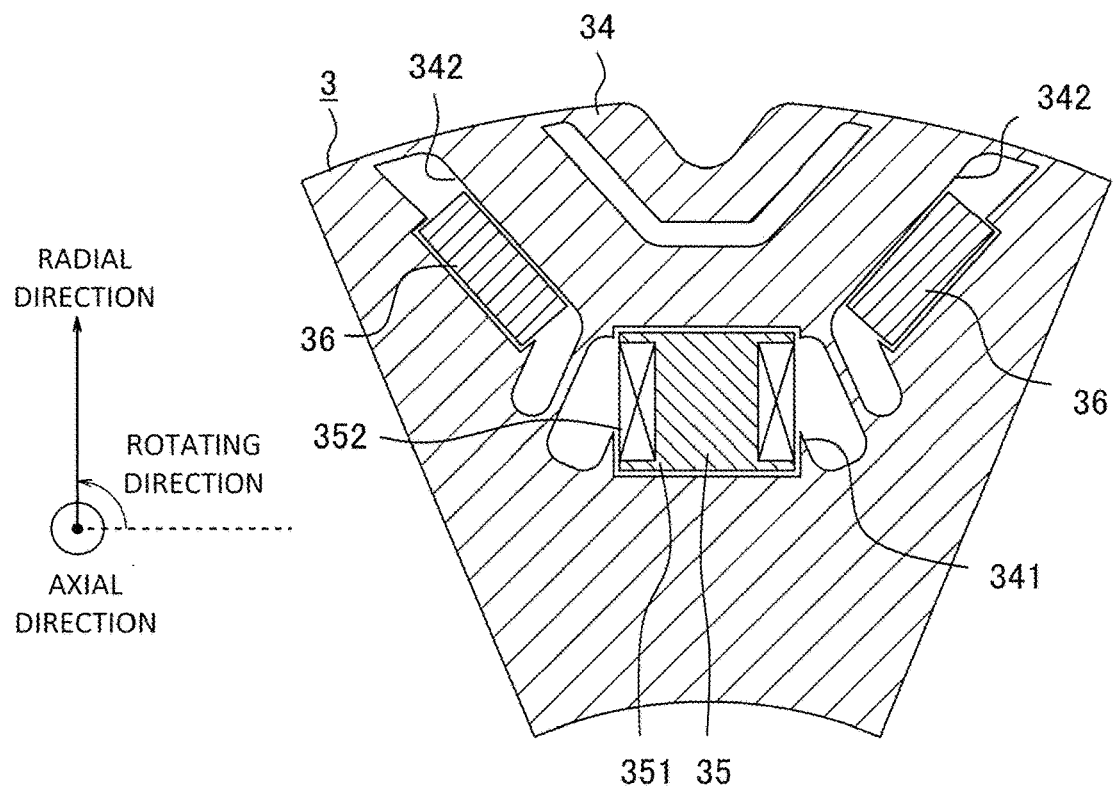
FIG. 10 is a sectional view for illustrating a main part of a rotor for a rotating electric machine according to a fourth embodiment of this invention.

FIG. 10 is a sectional view for illustrating a main part of a rotor for a rotating electric machine according to a fourth embodiment of this invention. The rotor winding portion 35 is arranged on a straight line that passes through a region between one pair of rotor permanent magnets 36 in the circumferential direction of the rotor core 34 and extends in the radial direction of the rotor core 34. Further, the rotor winding portion 35 is arranged in such a manner that a center of the rotor winding portion 35 in the radial direction of the rotor core 34 is located on a radially inner side of a center of each of the rotor permanent magnets 36 in the radial direction of the rotor core 34. Other configurations are the same as those of the rotor of the third embodiment.

Figure 11:
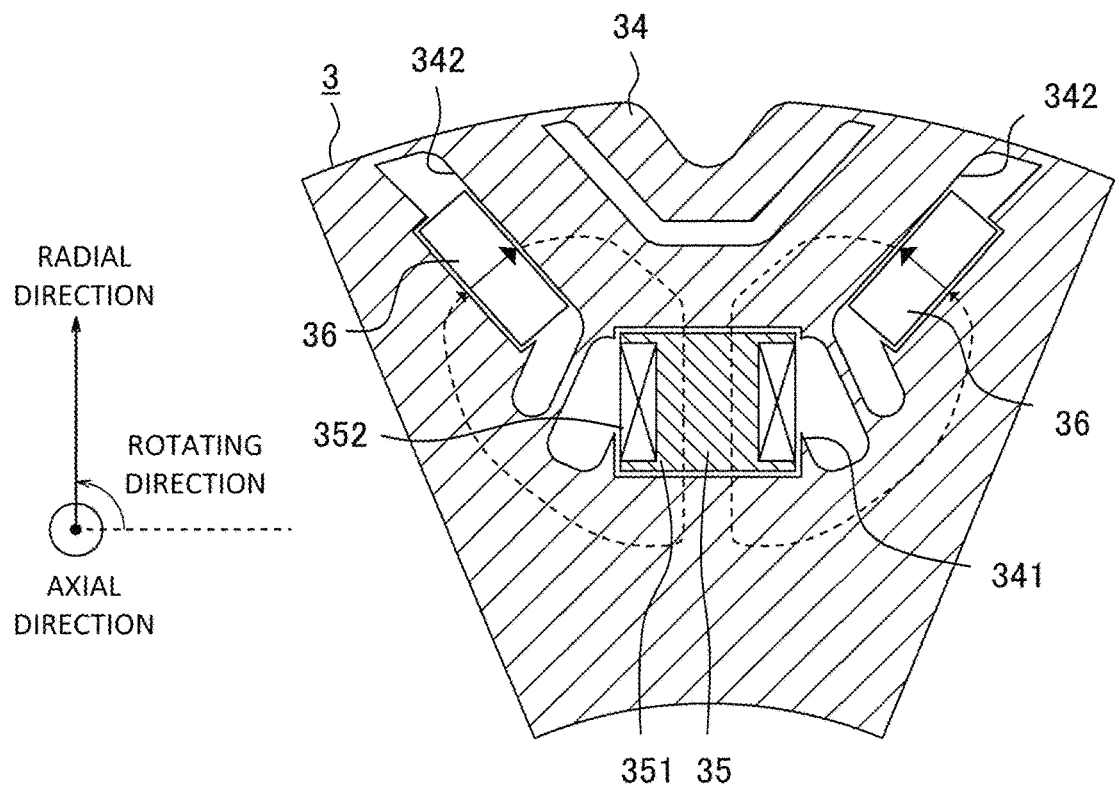
FIG. 11 is a view for illustrating magnetic flux passing through the rotor when a current is not supplied to rotor windings of FIG. 10.

FIG. 11 is a view for illustrating magnetic flux passing through the rotor 3 when a current is not supplied to the rotor windings 352 of FIG. 10. When a current is not supplied to the rotor windings 352, magnetic flux generated by the rotor permanent magnet 36 passes through a magnetic circuit. The magnetic circuit passes from the rotor permanent magnet 36 through the non-magnet portion 351 to return to the rotor permanent magnet 36. In other words, the magnetic flux generated by the rotor permanent magnet 36 is closed in the rotor 3. With the configuration described above, the voltage induced in the stator windings 22 through the rotation of the rotor 3 is reduced.

Meanwhile, when a current is supplied to the rotor windings 352, a direction of the magnetic flux generated by the rotor permanent magnet 36 and a direction of the magnetic flux generated by the rotor winding 352 are the same. With the magnetic flux described above, the voltage induced in the stator windings 22 through the rotation of the rotor 3 is increased.

As described above, in the rotor 3 for the rotating electric machine 1 according to the fourth embodiment of this invention, the rotor winding portion 35 is arranged on the straight line that passes through the region between one pair of rotor permanent magnets 36 in the circumferential direction of the rotor core 34 and extends in the radial direction of the rotor core 34. Further, the rotor winding portion 35 is arranged in such a manner that the center of the rotor winding portion 35 in the radial direction of the rotor core 34 is located on the radially inner side of the center of each of the rotor permanent magnets 36 in the radial direction of the rotor core 34. With the arrangement described above, when a current is supplied to the rotor windings 352, the voltage induced in the stator windings 22 through the rotation of the rotor 3 can be increased. Further, when a current is not supplied to the rotor windings 352, the magnetic flux generated by the rotor permanent magnet 36 passes through the non-magnet portion 351 to return to the rotor permanent magnet 36. Thus, when a current is not supplied to the rotor windings 352, the voltage induced in the stator windings 22 can be further reduced. As a result, a range in which the amount of magnetic flux passing from the rotor core 34 through the stator windings 22 is adjusted depending on whether or not the current is supplied to the rotor windings 352 can be increased. Thus, the efficiency of the rotating electric machine 1 can be further improved to further increase the output of the rotating electric machine 1.

Fifth Embodiment

Figure 12:
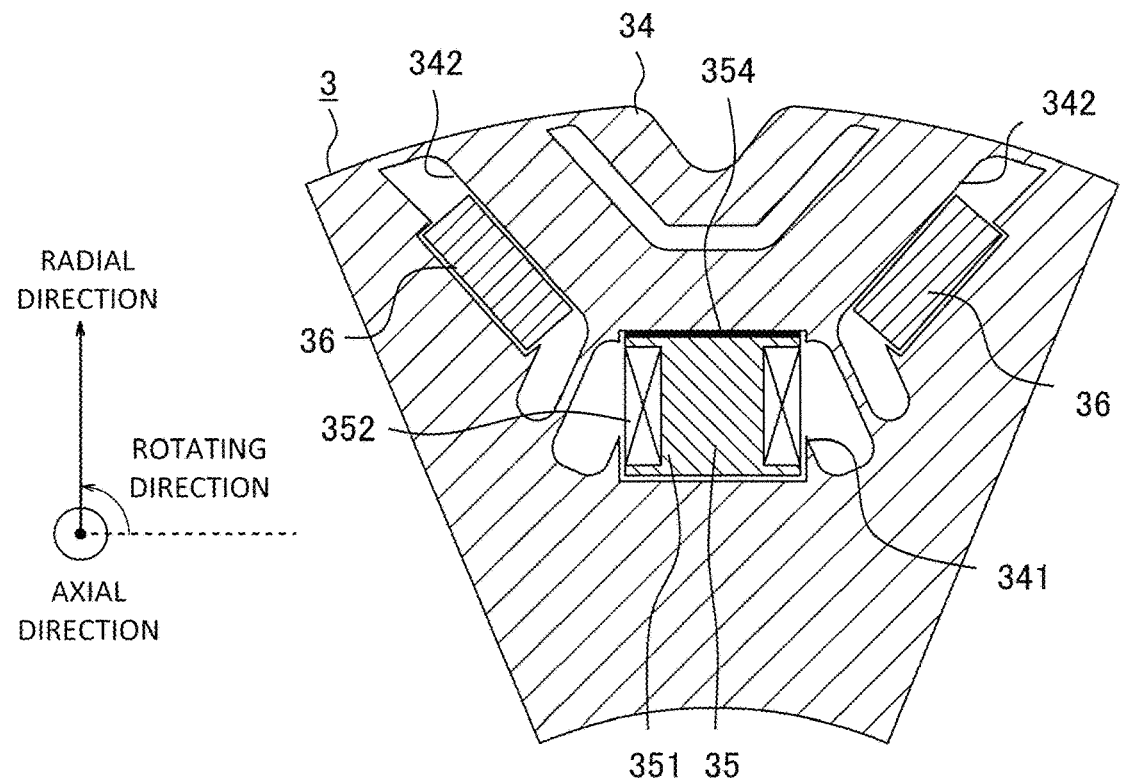
FIG. 12 is a sectional view for illustrating a main part of a rotor for a rotating electric machine according to a fifth embodiment of this invention.

FIG. 12 is a sectional view for illustrating a main part of a rotor for a rotating electric machine according to a fifth embodiment of this invention. The rotor winding portion 35 includes a fixing member 354. The fixing member 354 is provided between the non-magnet portion 351 and the rotor core 34, and is configured to fix the non-magnet portion 351 to the rotor core 34. As the fixing member 354, for example, an adhesive is given. A radially outer portion of the non-magnet portion 351 is fixed to the rotor core 34 through intermediation of the fixing member 354. In other words, a radially outwardly oriented surface of the non-magnet portion 351 serves as the fixed surface. Other configurations are the same as those of the rotor of the fourth embodiment. A radially inner portion of the non-magnet portion 351 may be fixed to the stator core 34 through intermediation of the fixing member 354. In other words, a radially inwardly oriented surface of the non-magnet portion 351 may serve as the fixed surface.

As described above, in the rotor 3 for the rotating electric machine 1 according to the fifth embodiment of this invention, the rotor winding portion 35 includes the fixing member 354 provided between the non-magnet portion 351 and the rotor core 34, which is configured to fix the non-magnet portion 351 to the rotor core 34. The fixing with the fixing member 354 enables the insertion of the rotor winding portion 35 into the winding-portion insertion hole 341 after a plurality of magnetic steel sheets for forming the rotor core 34 are laminated. As a result, the productivity of the rotor 3 can be improved. Further, the non-magnet portion 351 is fixed to the rotor core 34 through intermediation of the fixing member 354. With the fixing through the fixing member 354, stiffness of the rotor core 34 and the rotor winding portions 35 can be improved. As a result, a vibration resistance of the rotor 3 can be improved.

Sixth Embodiment

Figure 13:
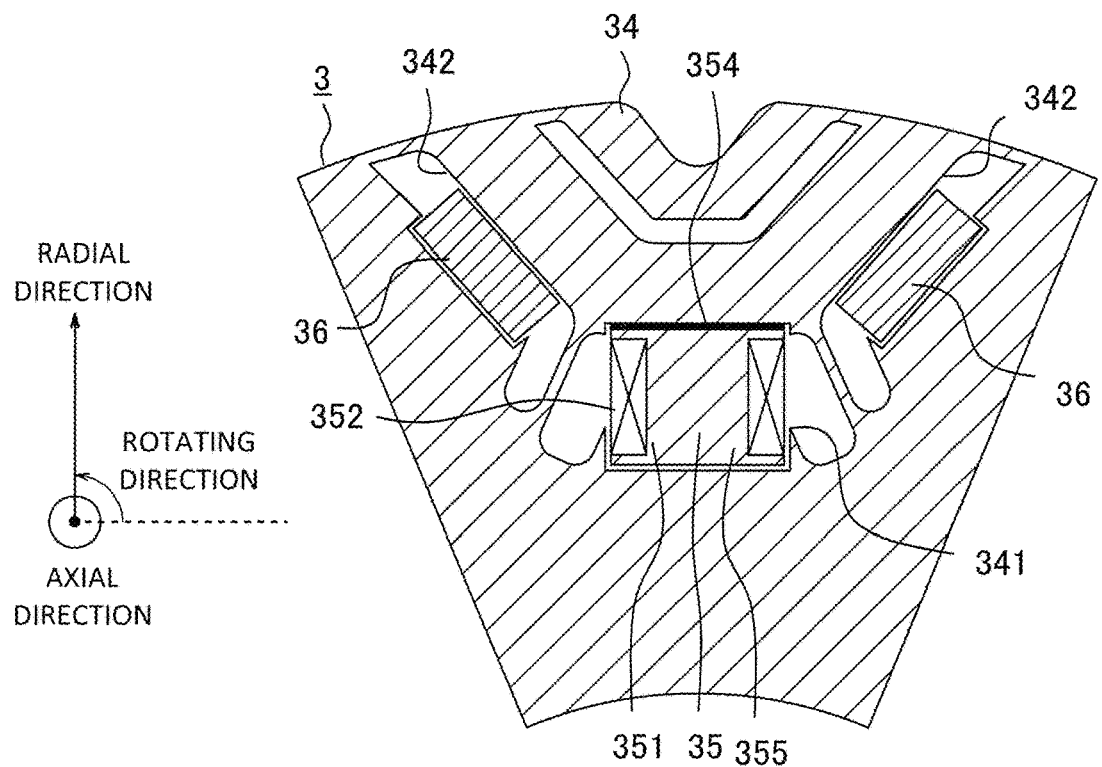
FIG. 13 is a sectional view for illustrating a main part of a rotor for a rotating electric machine according to a sixth embodiment of this invention.

FIG. 13 is a sectional view for illustrating a main part of a rotor for a rotating electric machine according to a sixth embodiment of this invention. The non-magnet portion 351 includes a non-magnet portion main body 355 and an insulating member (not shown). The non-magnet portion main body 355 is made of the same material as a material of the rotor core 34. The insulating member is provided between the non-magnet portion main body 355 and the rotor winding 352. Other configurations are the same as those of the rotor of the fifth embodiment.

As described above, in the rotor 3 for the rotating electric machine 1 according to the sixth embodiment of this invention, the non-magnet portion 351 includes the non-magnet portion main body 355 made of the same material as the material of the rotor core 34. With use of the material described above, the non-magnet portion main body 355 can be formed by punching the rotor core 34 made up of the magnetic steel sheets. As a result, a yield of the magnetic steel sheets can be improved.

Seventh Embodiment

Figure 14:
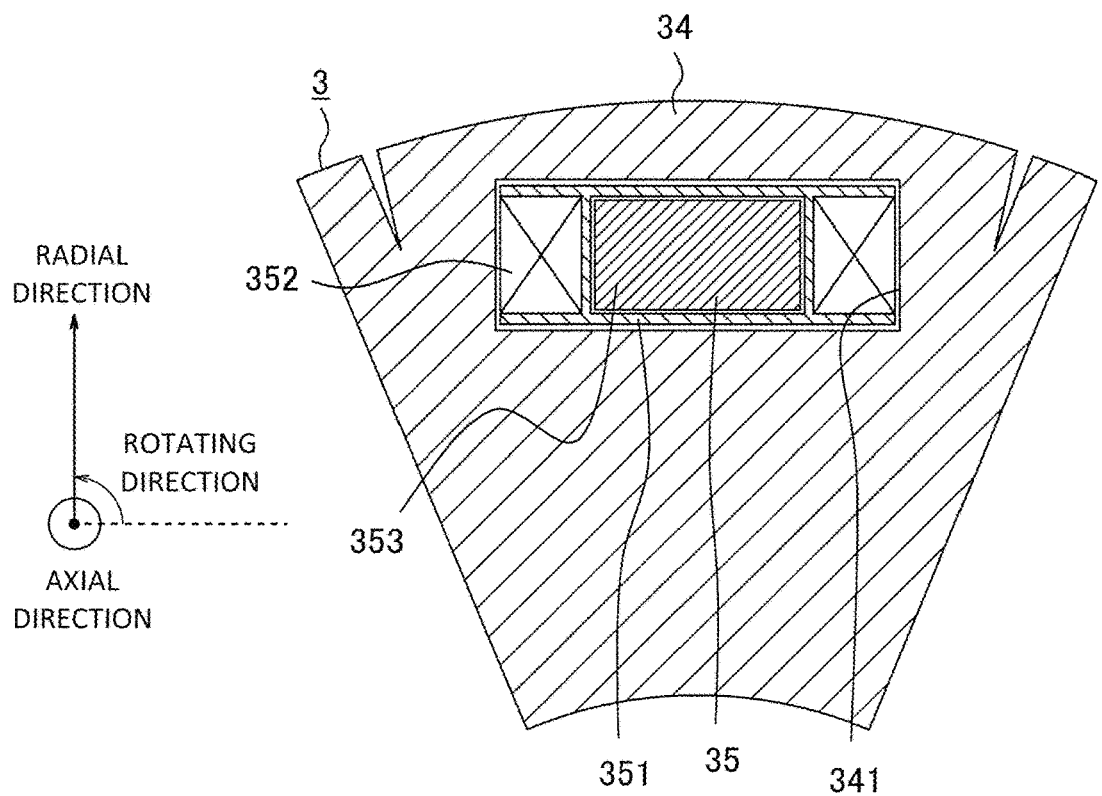
FIG. 14 is a sectional view for illustrating a main part of a rotor for a rotating electric machine according to a seventh embodiment of this invention.

FIG. 14 is a sectional view for illustrating a main part of a rotor for a rotating electric machine according to a seventh embodiment of this invention. The rotor core 34 has the winding-portion insertion holes 341. The rotor winding portion 35 is inserted into each of the winding-portion insertion holes 341. In contrast to the first embodiment, the rotor core 34 does not have the magnet insertion holes 342. Thus, the rotor 3 does not include the rotor permanent magnets 36.

The rotor winding portion 35 includes the non-magnet portion 351, the rotor winding 352, and the winding-portion permanent magnet 353. The rotor winding 352 is provided to the non-magnet portion 351. The winding-portion permanent magnet 353 is provided in the non-magnet portion 351 in such a manner as to be separate from the rotor winding 352. The non-magnet portion 351 is fixed to the rotor core 34. The rotor winding 352 is fixed to the rotor core 34 through intermediation of the non-magnet portion 351. Other configurations are the same as those of the rotor of the first embodiment.

As described above, in the rotor 3 for the rotating electric machine 1 according to the seventh embodiment of this invention, the rotor winding portion 35 includes the winding-portion permanent magnet 353, which is provided in the non-magnet portion 351 in such a manner as to be separate from the rotor winding 352. With the arrangement described above, transfer of the heat generated in the rotor windings 352 to the winding-portion permanent magnets 353 is suppressed. As a result, a rise in the temperature of the winding-portion permanent magnets 353 can be suppressed. Thus, the thermal demagnetization resistance characteristic of the winding-portion permanent magnets 353 can be improved.

Further, when a magnetic field in a direction opposite to a magnetization direction of the winding-portion permanent magnets 353 is generated for the winding-portion permanent magnets 353, a magnetic field in a direction of reducing an opposing magnetic field for the winding-portion permanent magnets 353 can be generated by supplying a current to the rotor windings 352. In this manner, a demagnetization characteristic of the winding-portion permanent magnets 353 can be suppressed.

Further, the non-magnet portion 351 is fixed to the rotor core 34. The rotor winding 352 is fixed to the rotor core 34 through intermediation of the non-magnet portion 351. With the arrangement described above, even when dimensions of the winding-portion permanent magnet 353 are changed, the rotor core 34 can be used without a modification by changing a shape of the non-magnet portion 351. Thus, for example, die manufacturing cost for manufacturing the rotor core 34 can be reduced.

Eighth Embodiment

Figure 15:
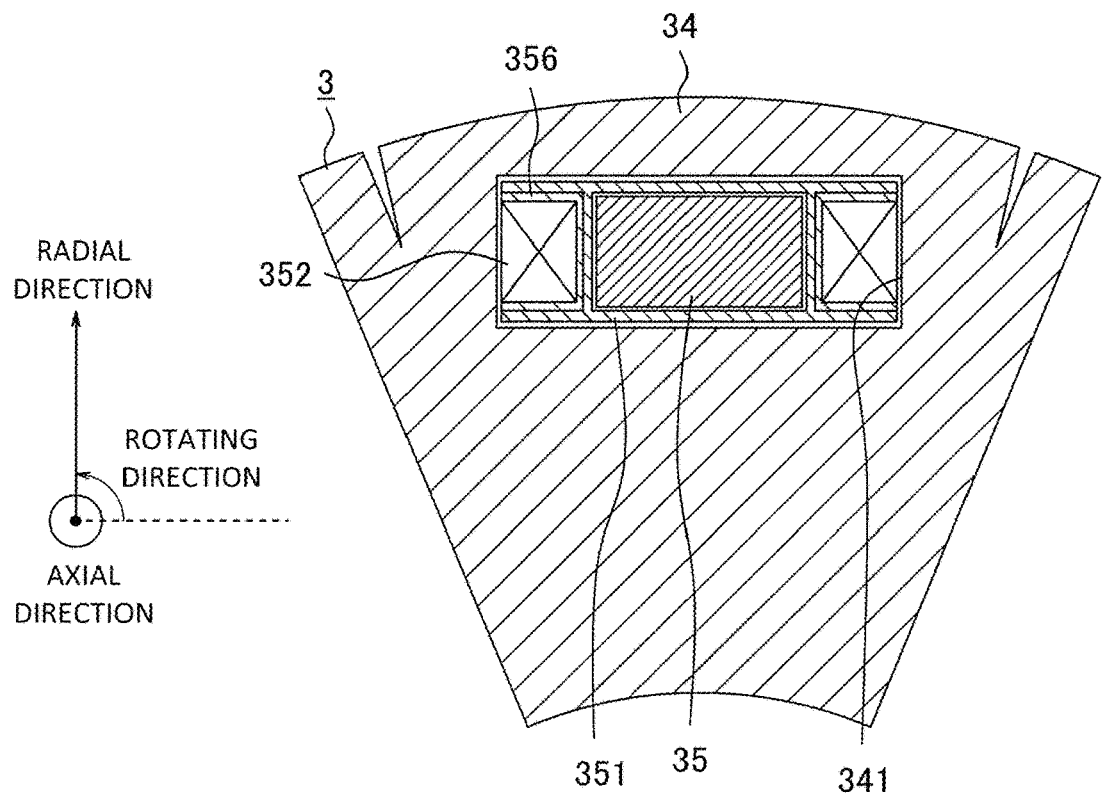
FIG. 15 is a sectional view for illustrating a main part of a rotor for a rotating electric machine according to an eighth embodiment of this invention.

FIG. 15 is a sectional view for illustrating a main part of a rotor for a rotating electric machine according to an eighth embodiment of this invention. The rotor winding portion 35 includes insulating members 356 provided between the non-magnet portion 351 and the rotor winding 352. Other configurations are the same as those of the rotor of the seventh embodiment.

As described above, in the rotor 3 for the rotating electric machine 1 according to the eighth embodiment of this invention, the rotor winding portion 35 includes the insulating members 356 provided between the non-magnet portion 351 and the rotor winding 352. The insulating members 356 enable improvement of insulation between the rotor windings 352 and the rotor core 34.

Ninth Embodiment

Figure 16:
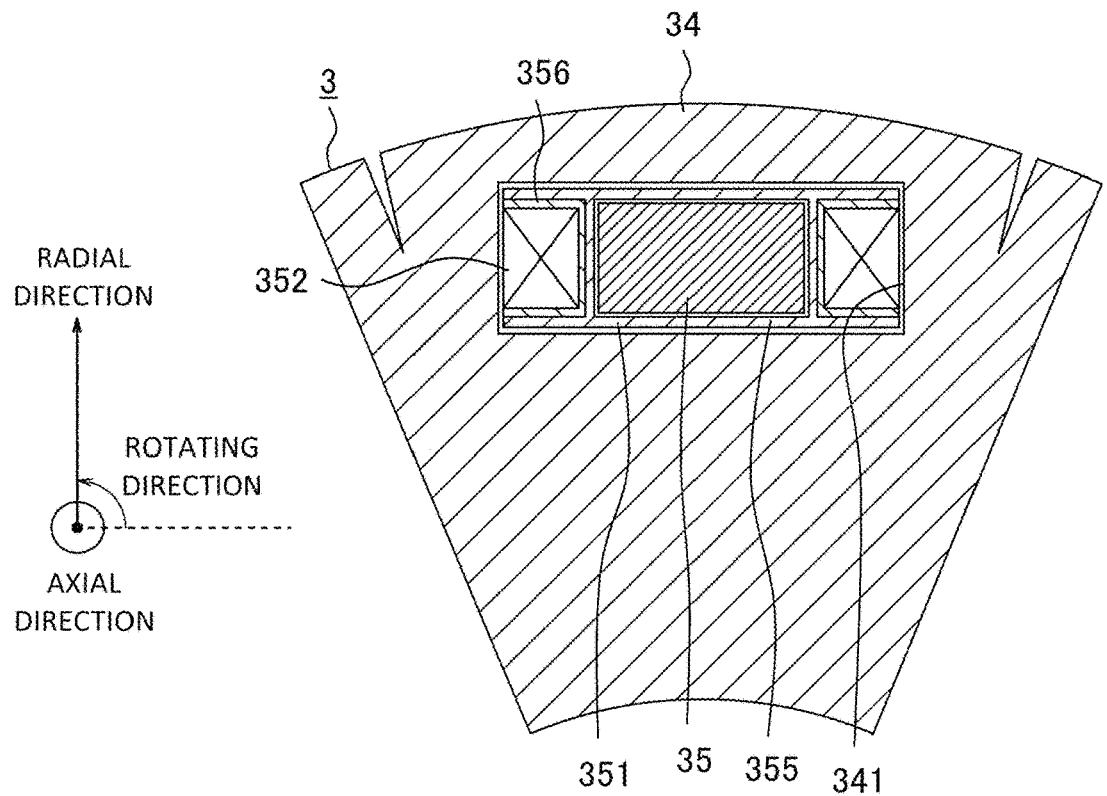
FIG. 16 is a sectional view for illustrating a main part of a rotor for a rotating electric machine according to a ninth embodiment of this invention.

FIG. 16 is a sectional view for illustrating a main part of a rotor for a rotating electric machine according to a ninth embodiment of this invention. The non-magnet portion 351 includes the non-magnet portion main body 355 made of the same material as the material of the rotor core 34. In this example, the non-magnet portion 351 is identical with the non-magnet portion main body 355. Thus, the non-magnet portion 351 is made of the same material as the material of the rotor core 34. Other configurations are the same as those of the rotor of the eighth embodiment.

As described above, in the rotor 3 for the rotating electric machine 1 according to the ninth embodiment of this invention, the non-magnet portion 351 includes the non-magnet portion main body 355 made of the same material as the material of the rotor core 34. With use of the material described above, the non-magnet portion main body 355 can be formed by punching the magnetic steel for forming the rotor core 34. As a result, a yield of the magnetic steel sheets can be improved.

Tenth Embodiment

Figure 17:
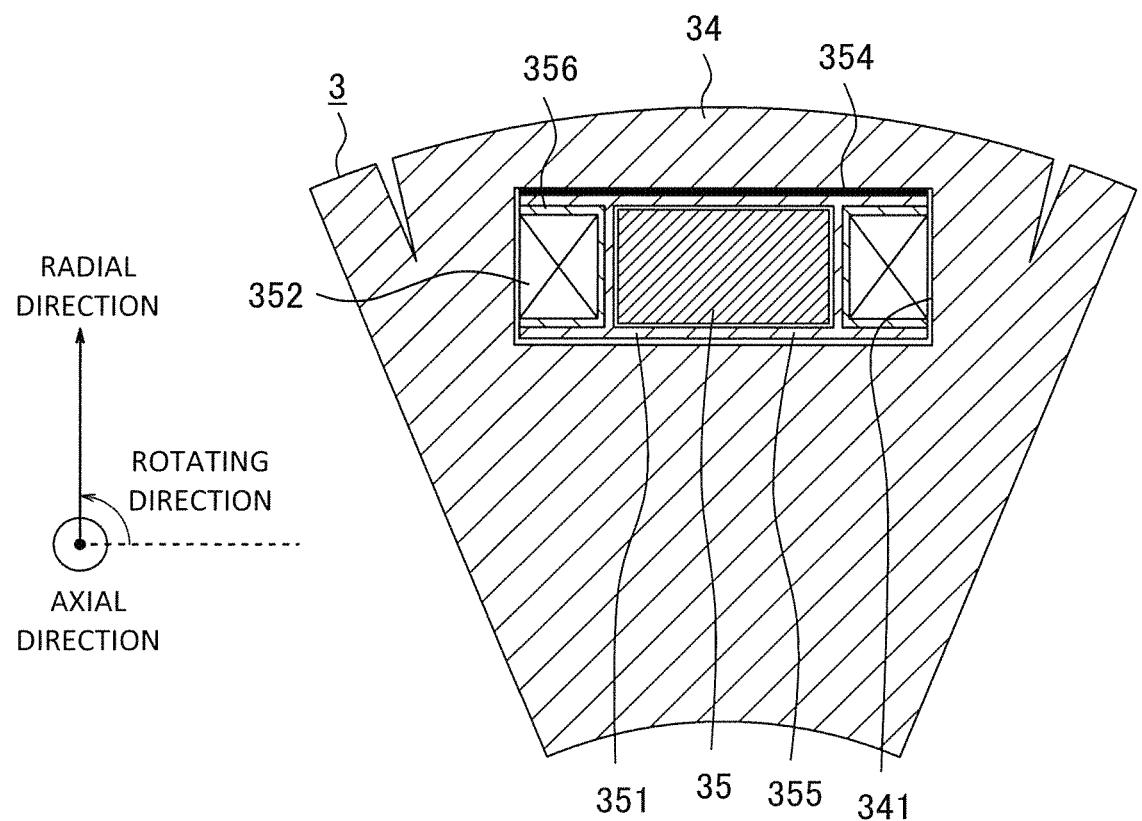
FIG. 17 is a sectional view for illustrating a main part of a rotor for a rotating electric machine according to a tenth embodiment of this invention.

FIG. 17 is a sectional view for illustrating a main part of a rotor for a rotating electric machine according to a tenth embodiment of this invention. The rotor winding portion 35 includes a fixing member 354. The fixing member 354 is provided between the non-magnet portion 351 and the rotor core 34, and is configured to fix the non-magnet portion 351 to the rotor core 34. As the fixing member 354, for example, an adhesive is given. A radially outer portion of the non-magnet portion 351 is fixed to the rotor core 34 through intermediation of the fixing member 354. In other words, a radially outwardly oriented surface of the non-magnet portion 351 serves as the fixed surface. Other configurations are the same as those of the rotor of the ninth embodiment. A radially inner portion of the non-magnet portion 351 may be fixed to the stator core 34 through intermediation of the fixing member 354. In other words, a radially inwardly oriented surface of the non-magnet portion 351 may serve as the fixed surface.

As described above, in the rotor 3 for the rotating electric machine 1 according to the tenth embodiment of this invention, the rotor winding portion 35 includes the fixing member 354 provided between the non-magnet portion 351 and the rotor core 34, which is configured to fix the non-magnet portion 351 to the rotor core 34. The fixing with the fixing member 354 enables the insertion of the rotor winding portion 35 into the winding-portion insertion hole 341 after a plurality of magnetic steel sheets for forming the rotor core 34 are laminated. As a result, the productivity of the rotor 3 can be improved. Further, the non-magnet portion 351 is fixed to the rotor core 34 through intermediation of the fixing member 354. With the fixing through the fixing member 354, stiffness of the rotor core 34 and the rotor winding portions 35 can be improved. As a result, a vibration resistance of the rotor 3 can be improved.

Eleventh Embodiment

Figure 18:
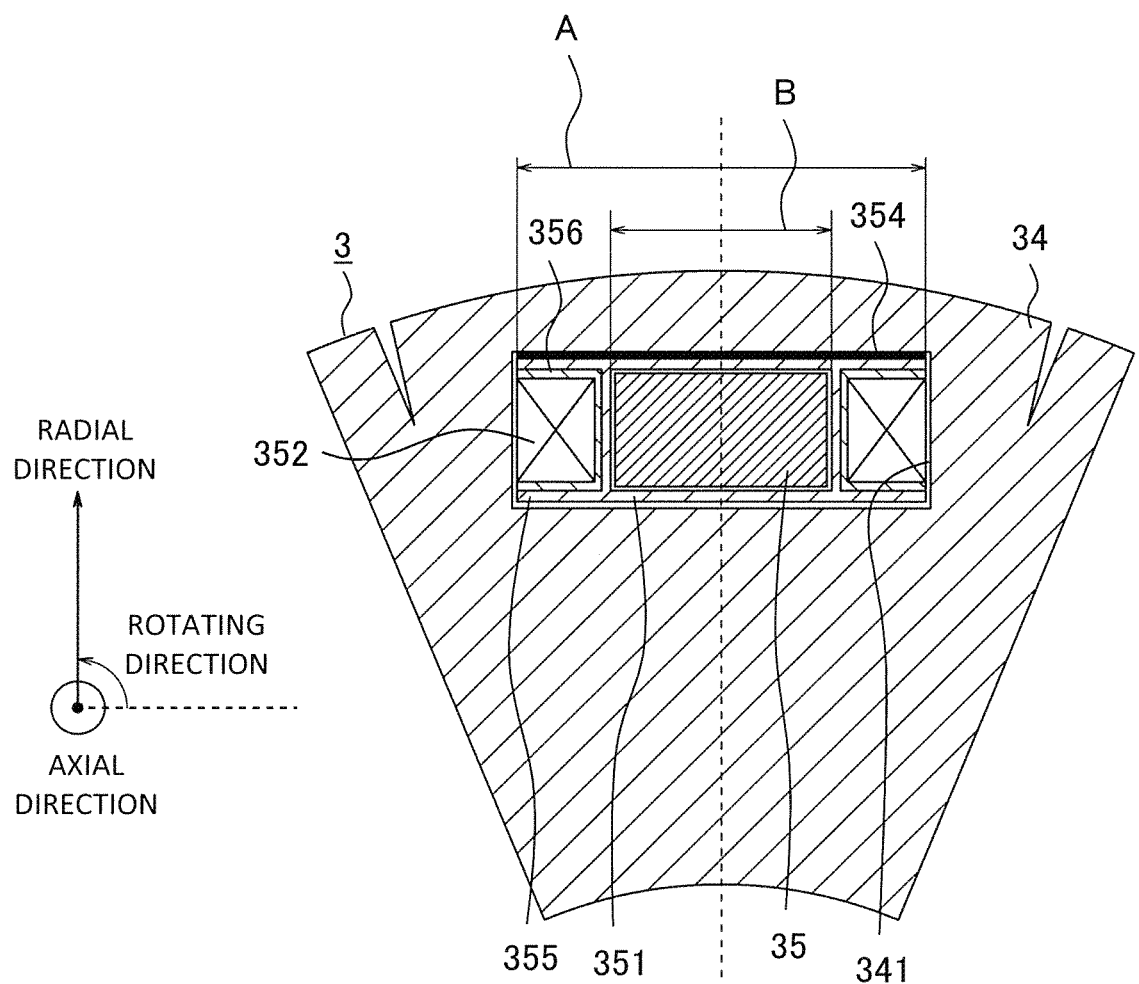
FIG. 18 is a sectional view for illustrating a main part of a rotor for a rotating electric machine according to an eleventh embodiment of this invention.

FIG. 18 is a sectional view for illustrating a main part of a rotor for a rotating electric machine according to an eleventh embodiment of this invention. A line that passes through a center of the rotor winding 352 and extends in the circumferential direction of the rotor core 34 is defined as a center line A. A line that passes through the winding-portion permanent magnet 353 and extends in the circumferential direction of the rotor core 34 is defined as a center line B. The rotor winding 352 and the winding-portion permanent magnet 353 are arranged so that the center line A and the center line B are on the same line. In other words, a center of the rotor winding 352 in the radial direction of the rotor core 34 matches a center of the winding-portion permanent magnet 353 in the radial direction of the rotor core 34. Further, a center of the rotor winding 352 in the circumferential direction of the rotor core 34 matches a center of the winding-portion permanent magnet 353 in the circumferential direction of the rotor core 34. Other configurations are the same as those of the rotor of the tenth embodiment.

As described above, in the rotor 3 for the rotating electric machine 1 according to the eleventh embodiment of this invention, the center line A that passes through the center of the rotor winding 352 and extends in the circumferential direction and the center line B that passes through the center of the winding-portion permanent magnet 353 and extends in the circumferential direction are on the same line. With the arrangement described above, the amount of magnetic flux generated by the rotor windings 352 and the winding-portion permanent magnets 353 can be adjusted by adjusting a value of the current supplied to the rotor windings 352. Further, even when the amount of magnetic flux generated by the rotor windings 352 changes with respect to the amount of magnetic flux generated by the winding-portion permanent magnets 353, symmetry of the magnetic flux generated by the rotor windings 352 and the magnetic flux generated by the winding-portion permanent magnets 353 in the circumferential direction is maintained. As a result, a torque ripple of the rotating electric machine 1 can be reduced. Further, an iron loss of the rotating electric machine 1 can be reduced.

Twelfth Embodiment

Figure 19:
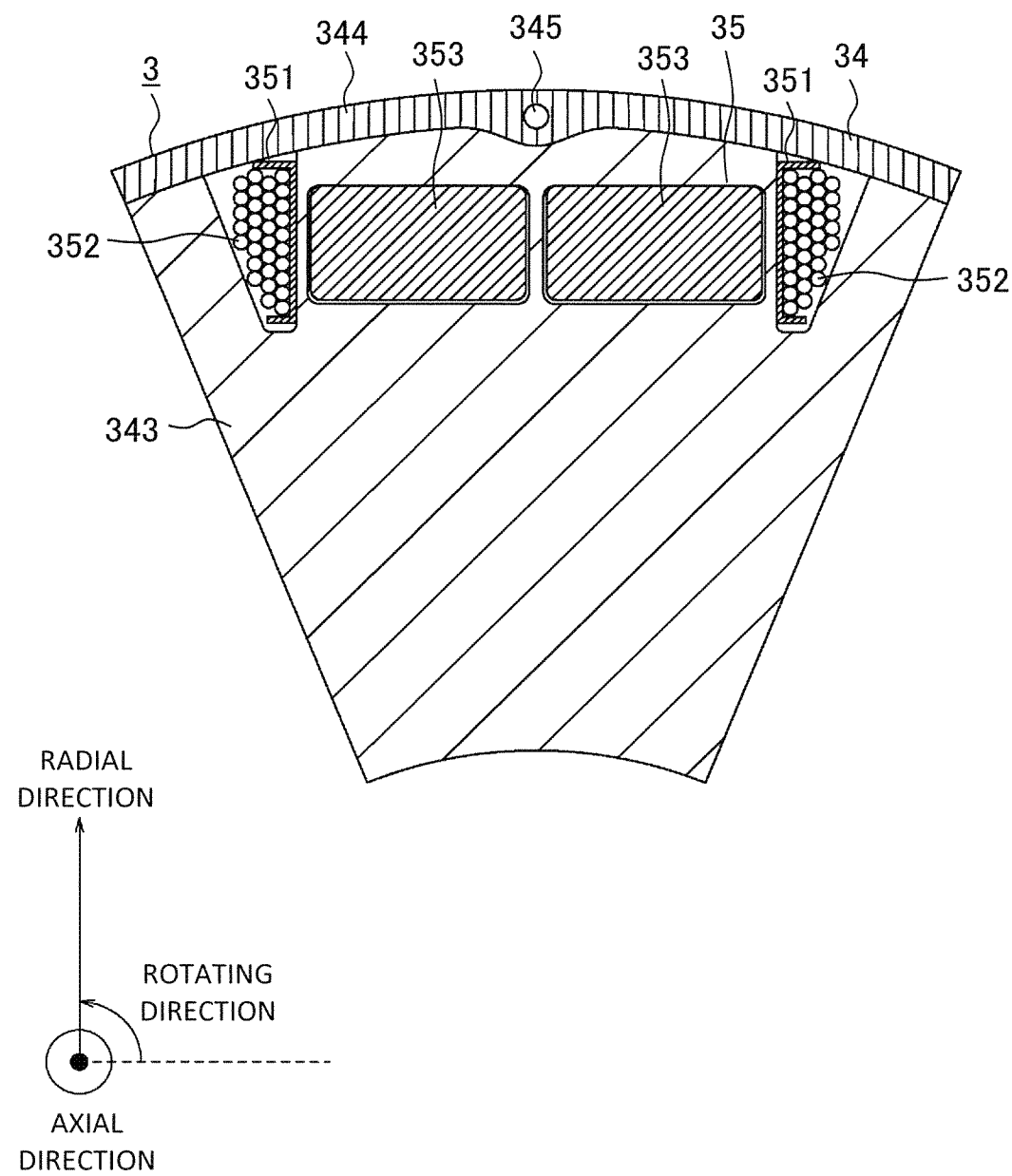
FIG. 19 is a sectional view for illustrating a main part of a rotor for a rotating electric machine according to a twelfth embodiment of this invention.
Figure 20:
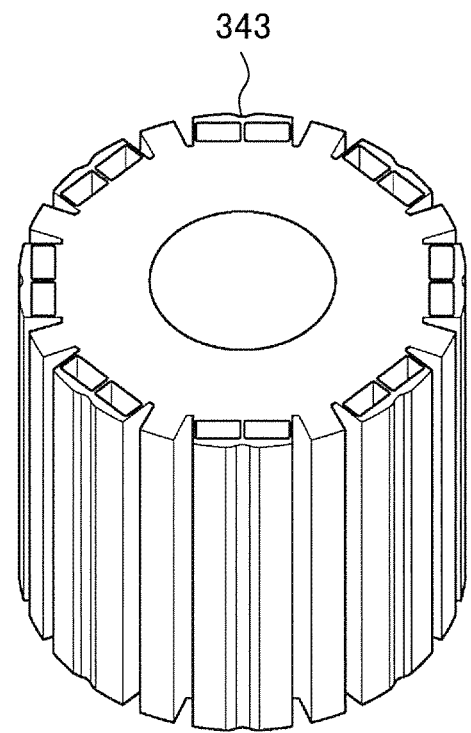
FIG. 20 is a perspective view for illustrating a radially inner-side core portion of FIG. 19.
Figure 21:
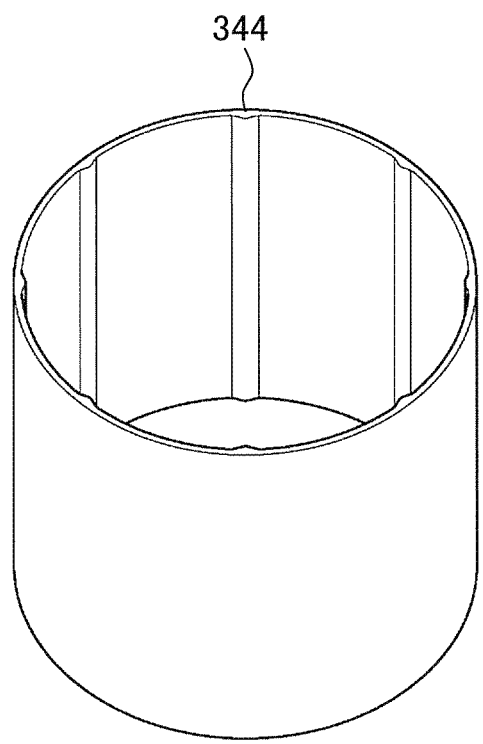
FIG. 21 is a perspective view for illustrating a radially outer-side core portion of FIG. 19.

FIG. 19 is a sectional view for illustrating a main part of a rotor for a rotating electric machine according to a twelfth embodiment of this invention. The rotor core 34 is divided into a radially inner-side core portion 343 and a radially outer-side core portion 344. In other words, the rotor core 34 includes the radially inner-side core portion 343 and the radially outer-side core portion 344. The radially outer-side core portion 344 is arranged on a radially outer side of the radially inner-side core portion 343. FIG. 20 is a perspective view for illustrating the radially inner-side core portion 343 of FIG. 19. FIG. 21 is a perspective view for illustrating the radially outer-side core portion 344 of FIG. 19. Each of the radially inner-side core portion 343 and the radially outer-side core portion 344 is formed in such a manner as to extend in the axial direction. When the radially inner-side core portion 343 is moved in the axial direction with respect to the radially outer-side core portion 344, the radially outer-side core portion 344 is removed from and mounted over the radially inner-side core portion 343. The radially inner-side core portion 343 and the radially outer-side core portion 344 are fixed to each other by, for example, shrink fitting or press-fitting.

As illustrated in FIG. 19, the rotor winding 352 is fixed to the radially inner-side core portion 343 through intermediation of the non-magnet portions 351 made of an insulating resin. As an example of the non-magnet portion 351, a bobbin or insulating paper is given.

The radially outer-side core portion 344 is arranged in a region on a radially outer side of the rotor windings 352. When a centrifugal force acts on the rotor windings 352, the radially outer-side core portion 344 restricts movement of the rotor windings 352 toward the radially outer side.

A material of the radially inner-side core portion 343 and a material of the radially outer-side core portion 344 are the same. The radially inner-side core portion 343 and the radially outer-side core portion 344 are formed by simultaneous punching using dies. The formation described above enables improvement of a yield of the radially inner-side core portion 343 and the radially outer-side core portion 344.

Caulking portions 345 are formed in the radially outer-side core portion 344. When the simultaneous punching of the radially inner-side core portion 343 and the radially outer-side core portion 344 is carried out, the magnetic steel sheets for forming the radially outer-side core portion 344 are fixed in the axial direction with use of the caulking portions 345. Other configurations are the same as those of the rotors of the seventh to eleventh embodiments.

As described above, in the rotor 3 for the rotating electric machine 1 according to the twelfth embodiment of this invention, the rotor core 34 includes the radially inner-side core portion 343 and the radially outer-side core portion 344. The radially outer-side core portion 344 restricts the movement of the rotor windings 352 toward the radially outer side. The radially outer-side core portion 344 allows the rotor windings 352 to be inserted from the radially outer side toward the radially inner side and to be mounted into the radially inner-side core portion 343. Thus, a magnet insertion step of inserting the winding-portion permanent magnets 353 into the radially inner-side core portion 343 and a rotor winding portion insertion step of inserting the rotor windings 352 into the radially inner-side core portion 343 can be carried out as separate steps. As a result, the need for post-magnetization using a magnetizer is eliminated. This enables suppression of an induced voltage in the rotor windings 352, which may result from the post-magnetization using a magnetizer. When a magnet having a high retention force such as a neodymium magnet is used as each of the winding-portion permanent magnets 353, a large magnetomotive force instantaneously affects the rotor windings 352. In this case, dielectric breakdown may occur in the rotor windings 352 due to the induced voltage generated in the rotor windings 352. Meanwhile, in the twelfth embodiment, the post-magnetization using a magnetizer is not needed. Thus, there is no influence on the rotor windings 352.

REFERENCE SIGNS LIST 1 rotating electric machine, 2 stator, 3 rotor, 21 stator core, 22 stator winding, 31 shaft, 32 bearing, 33 slip ring, 34 rotor core, 35 rotor winding portion, 36 rotor permanent magnet, 37 end plate, 101 battery, 102 power circuit unit, 103 control circuit unit, 341 winding-portion insertion hole, 342 magnet insertion hole, 343 radially inner-side core portion, 344 radially outer-side core portion, 345 caulking portion, 351 non-magnet portion, 352 rotor winding, 353 winding-portion permanent magnet, 354 fixing member, 355 non-magnet portion main body, 356 insulating member

The invention claimed is:

1. A rotor for a rotating electric machine, comprising:
a rotor core having magnet insertion holes;
rotor winding portions provided in the rotor core; and
rotor permanent magnets inserted into the magnet insertion holes,
wherein each of the rotor winding portions includes:
a non-magnet portion formed of a magnetic member other than a permanent magnet or a non-magnetic member; and
a rotor winding provided to the non-magnet portion,
wherein, when a direction perpendicular to a winding direction of each of the rotor winding portions is defined as a winding axial direction, each of the rotor winding portions is arranged in such a manner that the winding axis direction matches a radial direction of the rotor core,
wherein each of the non-magnet portions has a fixed surface fixed to the rotor core,
wherein the rotor windings are fixed to the rotor core through intermediation of the non-magnet portions,
wherein the rotor core has winding-portion insertion holes,
wherein the rotor winding portions are inserted into the winding-portion insertion holes, and
wherein the fixed surface is fixed to an inner surface of the winding-portion insertion hole.

2. The rotor for a rotating electric machine according to claim 1, wherein the fixed surface of each of the non-magnet portions is oriented in the winding-axis direction.

3. The rotor for a rotating electric machine according to claim 1, wherein the winding-portion insertion holes are formed in the rotor core that is undivided.

4. The rotor for a rotating electric machine according to claim 1, wherein each of the rotor winding portions further includes a winding-portion permanent magnet that is provided in the non-magnet portion in such a manner as to be separate from the rotor winding.

5. The rotor for a rotating electric machine according to claim 1,
wherein the rotor core has the magnet insertion holes formed in pairs arranged side by side in a circumferential direction of the rotor core,
wherein one pair of the rotor permanent magnets are separately inserted into each of the pairs of magnet insertion holes, and
wherein each of the rotor winding portions is arranged entirely between one pair of the rotor permanent magnets in the circumferential direction and at a center of a region between the one pair of the rotor permanent magnets in the circumferential direction.

6. The rotor for a rotating electric machine according to claim 5, wherein the rotor permanent magnets in each of the pairs are arranged in such a manner that surfaces of the rotor permanent magnets, each being located on a side closer to the rotor winding portion, have the same magnetic polarity.

7. The rotor for a rotating electric machine according to claim 1,
wherein the rotor core has the magnet insertion holes formed in pairs arranged side by side in a circumferential direction of the rotor core,
wherein one pair of the rotor permanent magnets are separately inserted into each of the pairs of magnet insertion holes,
wherein each of the rotor winding portions is arranged on a straight line that passes through a region between one pair of the rotor permanent magnets in the circumferential direction and extends in a radial direction of the rotor core, and
wherein each of the rotor winding portions is arranged in such a manner that a center of the rotor winding portion in the radial direction is located on a radially inner side of a center of the rotor permanent magnet in the radial direction.

8. The rotor for a rotating electric machine according to claim 1, wherein each of the rotor winding portions further includes a flat fixing member that is provided between the non-magnet portion and the rotor core, and is configured to fix the non-magnet portion to the rotor core.

9. The rotor for a rotating electric machine according to claim 1, wherein each of the non-magnet portions includes a non-magnet portion main body made of the same material as a material of the rotor core.

10. A rotor for a rotating electric machine, comprising:
a rotor core; and
rotor winding portions provided in the rotor core,
wherein each of the rotor winding portions includes:
   a non-magnet portion formed of a magnetic member other than a permanent magnet or a non-magnetic member;
   a rotor winding provided to the non-magnet portion; and
   a winding-portion permanent magnet provided in the non-magnet portion in such a manner as to be separate from the rotor winding,
wherein, when a direction perpendicular to a winding direction of each of the rotor winding portions is defined as a winding axial direction, each of the rotor winding portions is arranged in such a manner that the winding axis direction matches a radial direction of the rotor core,
wherein each of the non-magnet portions has a fixed surface fixed to the rotor core, and
wherein the rotor windings are fixed to the rotor core through intermediation of the non-magnet portions.

11. The rotor for a rotating electric machine according to claim 10,
wherein the rotor winding portions are insertable into the rotor core from a radially outer side,
wherein the rotor core includes:
a radially-inner side core portion having magnet insertion holes into which the winding-portion permanent magnets are to be inserted; and
a radially-outer side core portion provided on a radially outer side of the radially-inner side core portion, and
wherein the radially-outer side core portion is configured to restrict radially outward movement of the rotor winding portions from the radially inner-side core portion.

12. The rotor for a rotating electric machine according to claim 10,
wherein the rotor core has winding-portion insertion holes,
wherein the rotor winding portions are inserted into the winding-portion insertion holes, and
wherein the fixed surface is fixed to an inner surface of the winding-portion insertion hole.

13. The rotor for a rotating electric machine according to claim 10, wherein each of the rotor winding portions further includes an insulating member configured to support the rotor winding.

14. The rotor for a rotating electric machine according to claim 10, wherein each of the non-magnet portions includes a non-magnet portion main body made of the same material as a material of the rotor core.

15. The rotor for a rotating electric machine according to claim 10, wherein each of the rotor winding portions further includes a flat fixing member that is provided between the non-magnet portion and the rotor core, and is configured to fix the non-magnet portion to the rotor core.

16. The rotor for a rotating electric machine according to claim 10, wherein each of the rotor windings and each of the winding-portion permanent magnets are arranged in such a manner that a center line that passes through a center of the rotor winding and extends in a circumferential direction of the rotor core and a center line that passes through a center of the winding-portion permanent magnet and extends in the circumferential direction are on the same line.

17. The rotor for a rotating electric machine according to claim 1, wherein each of the non-magnet portions includes a non-magnet portion main body made of a different material than a material of the rotor core.

18. The rotor for a rotating electric machine according to claim 1, wherein each of the non-magnet portions includes a bobbin holding the rotor winding and arranged to be inserted into the winding-portion insertion hole.

19. The rotor for a rotating electric machine according to claim 1, wherein the fixed surface is fixed to only one side of the inner surface of the winding-portion insertion hole.

20. The rotor for a rotating electric machine according to claim 4, wherein the winding-portion permanent magnet is separated from the rotor core in a radial direction by the non-magnet portion.

21. The rotor for a rotating electric machine according to claim 1, wherein the rotor permanent magnets are arranged outside of the rotor winding included in each of the rotor winding portions.

22. The rotor for a rotating electric machine according to claim 10, wherein each of the non-magnet portions includes a non-magnet portion main body made of a different material than a material of the rotor core.

23. The rotor for a rotating electric machine according to claim 10, wherein the fixed surface is fixed to only one side of the inner surface of the winding-portion insertion hole.

24. The rotor for a rotating electric machine according to claim 10, wherein the winding-portion permanent magnet is separated from the rotor core in a radial direction by the non-magnet portion.

25. The rotor for a rotating electric machine according to claim 10, wherein each of the non-magnet portions includes a bobbin holding the rotor winding and arranged to be inserted into the winding-portion insertion hole.

* * * * *